US012588033B2

(12) United States Patent
Li et al.

(10) Patent No.: US 12,588,033 B2
(45) Date of Patent: Mar. 24, 2026

(54) RESOURCE TRANSMISSION METHOD, RESOURCE TRANSMISSION APPARATUS, AND COMMUNICATIONS DEVICE

(71) Applicant: VIVO MOBILE COMMUNICATION CO., LTD., Guangdong (CN)

(72) Inventors: Na Li, Guangdong (CN); Gen Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 442 days.

(21) Appl. No.: 18/094,923

(22) Filed: Jan. 9, 2023

(65) Prior Publication Data

US 2023/0164798 A1     May 25, 2023

Related U.S. Application Data

(63) Continuation of application No. PCT/CN2021/105508, filed on Jul. 9, 2021.

(30) Foreign Application Priority Data

Jul. 9, 2020    (CN) .......................... 202010659373.5

(51) Int. Cl.
*H04W 72/044*         (2023.01)
*H04L 5/00*         (2006.01)
(Continued)

(52) U.S. Cl.
CPC ............ *H04W 72/23* (2023.01); *H04W 72/11* (2023.01); *H04W 72/1263* (2013.01)

(58) Field of Classification Search
CPC . H04W 72/23; H04W 72/11; H04W 72/1263; H04W 72/232; H04W 72/044; H04L 1/08
See application file for complete search history.

(56) References Cited

U.S. PATENT DOCUMENTS 11,777,657 B2 * 10/2023 Chien ................... H04L 1/1858
                                                          370/329
12,289,712 B2 * 4/2025 Ren .......................... H04L 1/08
(Continued)

FOREIGN PATENT DOCUMENTS

CN       106455093 A     2/2017
CN       110324904 A     10/2019
(Continued)

OTHER PUBLICATIONS

3GPP TSG-RAN WG1 Meeting #94, R1-1808577 Title:On the out-of-order HARQ-ACK support for URLLC (Year: 2018).*
(Continued)

*Primary Examiner* — Faruk Hamza
*Assistant Examiner* — Abusayeed M Haque
(74) *Attorney, Agent, or Firm* — BROOKS KUSHMAN P.C.

(57)     ABSTRACT

A resource transmission method, a resource transmission apparatus, and a communications device. When the resource transmission method is applied to a network-side device, the method includes: sending downlink control information DCI, the DCI being used to indicate that a terminal is to perform transmission of at least one shared channel; where in a case that the shared channels are at least two in quantity, each of the at least two shared channels is repeatedly transmitted N times, N being an integer greater than 1.

14 Claims, 14 Drawing Sheets

(51) Int. Cl.
    *H04W 72/11*     (2023.01)
    *H04W 72/1263*   (2023.01)
    *H04W 72/23*     (2023.01)

(56)            References Cited

U.S. PATENT DOCUMENTS

| | | | |
|---|---|---|---|
| 2019/0306856 A1 | 10/2019 | Ji et al. | |
| 2020/0008225 A1 | 1/2020 | Lee et al. | |
| 2020/0313796 A1* | 10/2020 | Park | H04L 1/0027 |
| 2020/0358557 A1* | 11/2020 | Park | H03M 13/618 |
| 2021/0168849 A1 | 6/2021 | Oh et al. | |
| 2022/0095359 A1* | 3/2022 | Wei | H04L 5/0048 |
| 2022/0132555 A1* | 4/2022 | Blankenship | H04W 72/23 |

FOREIGN PATENT DOCUMENTS

| | | | | |
|---|---|---|---|---|
| CN | 110710318 A | | 1/2020 | |
| CN | 110913488 | * | 3/2020 | H04W 72/0446 |
| CN | 110913488 A | | 3/2020 | |
| WO | 2019195715 A1 | | 10/2019 | |
| WO | 2020022650 A1 | | 1/2020 | |
| WO | 2021245624 A1 | | 12/2021 | |

OTHER PUBLICATIONS

3GPP TSG-RAN WG103-e, R1-2007779 Title:A remaining issue on UE procedures for reporting HARQ-ACK on uplink (Year: 2020).*

First Office Action for Chinese Application No. 202010659373.5, dated Jun. 6, 2022, 11 Pages.

International Search Report and Written Opinion for Application No. PCT /CN2021/105508, dated Oct. 9, 2021, 8 Pages.

Huawei, "Blind/HARQ-less Repetition for Scheduled DL-SCH Operation" 3GPP TSG RAN WG1 Meeting #93, Busan, Korea, May 2018, R1-1805867, 6 Pages.

LG Electronics, "Discussion on blind/HARQ-less PDSCH repetition for URLLC" 3GPP TSG RAN WG1 Meeting #93, Busan, Republic of Korea, May 2018, R1-1806598, 8 Pages.

Extended European Search Report for Application No. 21838256.2, dated Dec. 8, 2023, 10 Pages.

ZTE "PUSCH enhancements for NR URLLC" 3GPP TSG RAN WG1 #97, Reno, USA, May 2019, R1-1906411, 8 Pages.

First Office Action for Japanese Application No. 2023-501504, dated Dec. 6, 2023, 4 Pages.

ETRI "Potential enhancements to PUSCH" 3GPP TSG RAN WG1 #96, Athens, Greece, Feb. 2019, R1-1902443, 8 Pages.

ETRI "PUSCH enhancements for enhancements for URLLC" 3GPP TSG RAN WG1 Meeting #97, Reno, USA, May 2019, R1-1907042, 6 Pages.

NTT Docomo, Inc. "Harq enhancement for NR-U" 3GPP TSG RAN WG1 #99, Reno, USA, Nov. 2019, R1-1912876, 9 Pages.

First Office Action for Korean Application No. 10-2023-7004218, dated Apr. 9, 2025, 11 Pages (incl. English translation).

Huawei et al., "Other Maintenance for NR-U," 3GPP TSG RAN WG1 #101-e, e-meeting, May 25-Jun. 5, 2020, R1-2003517, 4 Pages.

Ericsson, "HARQ Enhancement," 3GPP TSG-RAN WG1 #101-e, e-meeting, May 25-Jun. 5, 2020, R1-2003845, 8 Pages.

Second Korean Office Action for Korean Patent Application No. 1020237004218 mailed Dec. 24, 2025. 11 pages.

CATT. Pusch enhancements for URLLC. 3GPP TSG RAN WG1 Meeting #98. R1-1908596. Online. Aug. 2019. 7 pages.

* cited by examiner

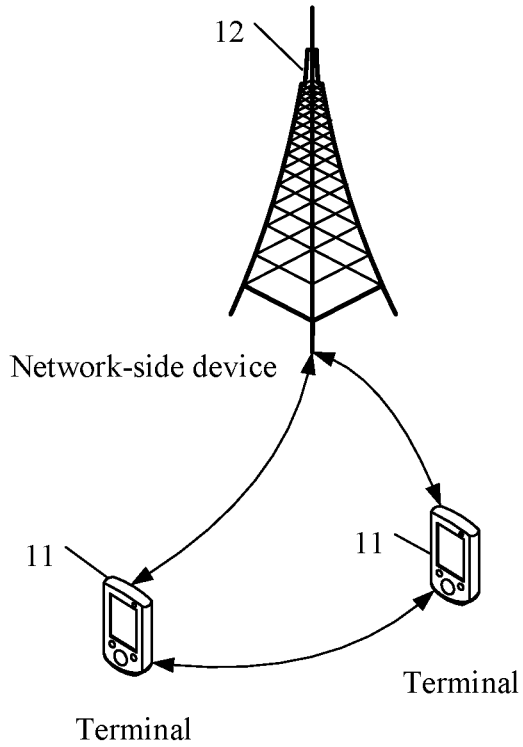

Network-side device

12

11    11

Terminal

Terminal

FIG. 1

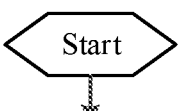

Start

Send downlink control information DCI, the DCI being used to indicate
that a terminal is to perform transmission of at least one shared channel;
where in a case that the shared channels are at least two in quantity,
each of the at least two shared channels is repeatedly transmitted N
times, N being an integer greater than 1

201

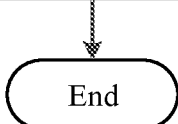

End

FIG. 2

| Row index | K2 | S | L | S | L | S | L | S | L |
|-----------|----|----|----|----|----|----|----|----|----|
| 1 | 1 | 0 | 12 | N/A | N/A | N/A | N/A | N/A | N/A |
| 2 | 1 | 0 | 4 | 4 | 5 | 9 | 4 | N/A | N/A |
| 3 | 1 | 0 | 7 | 7 | 7 | 0 | 7 | 7 | 7 |
| ... | | | | | | | | | |

| Row index | K2 | S | L | S | L | S | L | S | L |
|-----------|----|----|----|-----|-----|-----|-----|-----|-----|
| 1 | 1 | 0 | 4 | N/A | N/A | N/A | N/A | N/A | N/A |
| 2 | 1 | 0 | 4 | 4 | 4 | 8 | 4 | N/A | N/A |
| 3 | 1 | 0 | 4 | 4 | 4 | 9 | 4 | 0 | 4 |
| ... | | | | | | | | | |

FIG. 2e

RESOURCE TRANSMISSION METHOD, RESOURCE TRANSMISSION APPARATUS, AND COMMUNICATIONS DEVICE

CROSS-REFERENCE TO RELATED APPLICATIONS

This application is a continuation of PCT International Application No. PCT/CN2021/105508 filed on Jul. 9, 2021, which claims priority to Chinese Patent Application No. 202010659373.5, filed on Jul. 9, 2020, which are incorporated herein by reference in their entireties.

TECHNICAL FIELD

This application pertains to the field of communications technologies, and specifically relates to a resource transmission method, a resource transmission apparatus, and a communications device.

BACKGROUND

In a communications system, a terminal transmits physical uplink shared channels (PUSCH) and physical downlink shared channels (PDSCH). Transmission information of the PUSCH and the PDSCH is usually configured in downlink control information (DCI) by a network-side device. Currently, one PUSCH or one PDSCH can be transmitted in only one slot, and multiple PUSCHs or multiple PDSCHs need to be transmitted in multiple different slots, which results in a need to use multiple pieces of DCI to indicate transmission information of different PUSCHs or PDSCHs, increasing transmission burden between the network-side device and the terminal.

SUMMARY

According to a first aspect, a resource transmission method is provided. The method is applied to a network-side device and includes:

sending downlink control information DCI, the DCI being used to indicate that a terminal is to perform transmission of at least one shared channel; where in a case that the shared channels are at least two in quantity, each of the at least two shared channels is repeatedly transmitted N times, N being an integer greater than 1.

According to a second aspect, a resource transmission method is provided. The method is applied to a terminal and includes:

receiving downlink control information DCI; and performing transmission of at least one shared channel according to the DCI; where in a case that the shared channels are at least two in quantity, each of the at least two shared channels is repeatedly transmitted N times, N being an integer greater than 1.

According to a third aspect, a resource transmission apparatus is provided. The apparatus is applied to a network-side device and includes:

a sending module, configured to send downlink control information DCI, the DCI being used to indicate that a terminal is to perform transmission of at least one shared channel; where in a case that the shared channels are at least two in quantity, each of the at least two shared channels is repeatedly transmitted N times, N being an integer greater than 1.

According to a fourth aspect, a resource transmission apparatus is provided. The apparatus is applied to a terminal and includes:

a first receiving module, configured to receive downlink control information DCI; and a first execution module, configured to perform transmission of at least one shared channel according to the DCI; where in a case that the shared channels are at least two in quantity, each of the at least two shared channels is repeatedly transmitted N times, N being an integer greater than 1.

According to a fifth aspect, a resource transmission method is provided, including:

receiving, by a terminal, downlink control information DCI;

performing, by the terminal, transmission of one shared channel according to the DCI in a case that a first resource index table indicated in configuration information of the DCI includes no resource row index 2; or, performing, by the terminal, transmission of at least two shared channels according to the DCI in a case that a second resource index table indicated in configuration information of the DCI includes a resource row index 2; or, performing, by the terminal, transmission of at least one shared channel according to the DCI in a case that configuration information of the DCI indicates a resource row index 2 and that the configuration information includes a repetition count; where the resource row index 2 is used to indicate that the terminal is to transmit at least two shared channels.

According to a sixth aspect, a resource transmission apparatus is provided, including:

a second receiving module, configured to receive downlink control information DCI; and a second execution module, configured to perform transmission of one shared channel according to the DCI in a case that a first resource index table indicated in configuration information of the DCI includes no resource row index 2; or, perform transmission of at least two shared channels according to the DCI in a case that a second resource index table indicated in configuration information of the DCI includes a resource row index 2; or, perform transmission of at least one shared channel according to the DCI in a case that configuration information of the DCI indicates a resource row index 2 and that the configuration information includes a repetition count; where the resource row index 2 is used to indicate that the terminal is to transmit at least two shared channels.

According to a seventh aspect, a terminal is provided, including a processor, a memory, and a program or instructions stored in the memory and capable of running on the processor, where when the program or instructions are executed by the processor, the steps of the resource transmission method according to the fifth aspect are implemented.

According to an eighth aspect, a communications device is provided, including a processor, a memory, and a program or instructions stored in the memory and capable of running on the processor, where when the program or instructions are executed by the processor, the steps of the resource transmission method according to the first aspect are implemented, or when the program or instructions are executed by the processor, the steps of the resource transmission method according to the second aspect are implemented.

According to a ninth aspect, a readable storage medium is provided, where the readable storage medium stores a program or instructions, and when the program or instructions are executed by a processor, the steps of the resource transmission method according to the first aspect are implemented; or when the program or instructions are executed by a processor, the steps of the resource transmission method according to the second aspect are implemented; or when the program or instructions are executed by a processor, the steps of the resource transmission method according to the fifth aspect are implemented.

According to a tenth aspect, a chip is provided, where the chip includes a processor and a communications interface, the communications interface is coupled to the processor, and the processor is configured to run a program or instructions to implement the resource transmission method according to the first aspect, or to implement the resource transmission method according to the second aspect, or to implement the resource transmission method according to the fifth aspect.

BRIEF DESCRIPTION OF DRAWINGS

FIG. 1 is a block diagram of a wireless communications system to which an embodiment of this application is applicable;

Figure 2B:
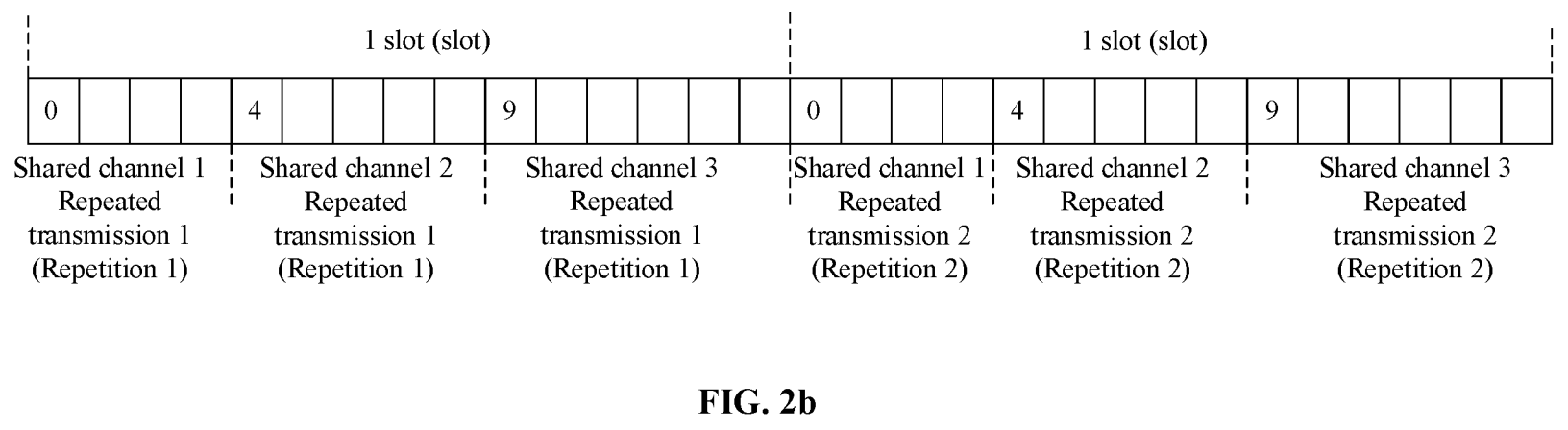

FIG. 2 is a flowchart of a resource transmission method according to an embodiment of this application;

FIG. 2a is a resource index table applied in a resource transmission method according to an embodiment of this application;

FIG. 2b is a schematic diagram of resource transmission in a resource transmission method according to an embodiment of this application;

FIG. 2e is another resource index table applied in a resource transmission method according to an embodiment of this application;

DETAILED DESCRIPTION

Figure 2C:
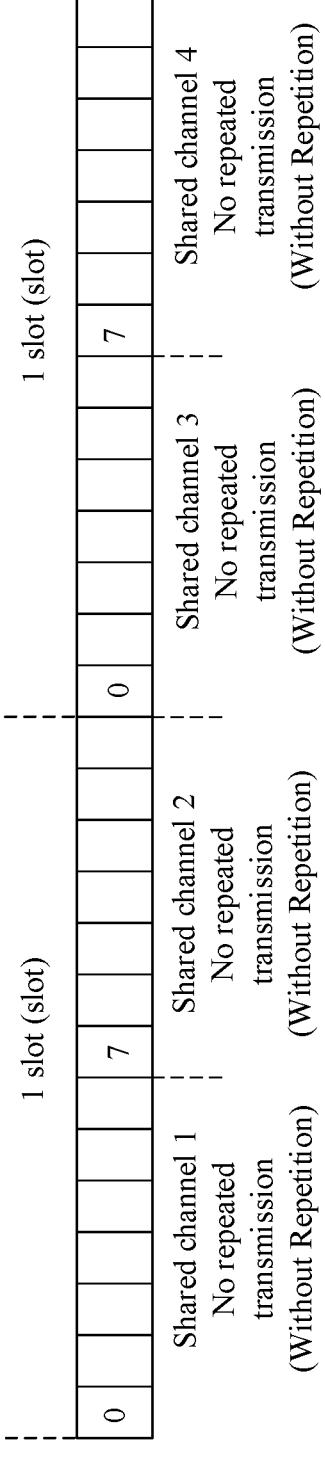
FIG. 2c is a schematic diagram of resource transmission in another resource transmission method according to an embodiment of this application.

The following clearly describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that data used in this way is used interchangeably in appropriate circumstances so that the embodiments of this application can be implemented in other orders than the order illustrated or described herein. In addition, "first" and "second" are usually used to distinguish objects of a same type, and do not restrict a quantity of objects. For example, there may be one or a plurality of first objects. In addition, "and/or" in the specification and claims represents at least one of connected objects, and the character "/" generally indicates an "or" relationship between the associated objects.

It should be noted that the technologies described in the embodiments of this application are not limited to long term evolution (LTE)/LTE-Advanced (LTE-A) systems, and may also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably. The technology described may be used in the above-mentioned systems and radio technologies as well as other systems and radio technologies. However, in the following descriptions, a new radio (NR) system is described for an illustration purpose, and NR terms are used in most of the following descriptions, although these technologies may also be applied to other applications than an NR system application, such as a 6th generation (6G) communications system.

FIG. 1 is a block diagram of a wireless communications system to which an embodiment of this application is applicable. The wireless communications system includes a terminal 11 and a network-side device 12. The terminal 11 may also be referred to as a terminal device or user equipment (UE). The terminal 11 may be a terminal-side device such as a mobile phone, a tablet personal computer, a laptop computer also referred to as a notebook computer, a personal digital assistant (PDA), a palmtop computer, a netbook, an ultra-mobile personal computer (UMPC), a mobile Internet device (MID), a wearable device or a vehicle user equipment (VUE), or a pedestrian user equipment (PUE). The wearable device includes a wristband, earphones, glasses, and the like. It should be noted that a specific type of the terminal 11 is not limited in the embodiments of this application. The network-side device 12 may be a base station or a core network, where the base station may be referred to as a NodeB, an evolved NodeB, an access point, a base transceiver station (BTS), a radio base station, a radio transceiver, a basic service set (BSS), an extended service set (ESS), a Node B, an evolved Node B (eNB), a home NodeB, a home evolved NodeB, a WLAN access point, a Wi-Fi node, a transmission and reception point (TRP), or another appropriate term in the art. As long as the same technical effect is achieved, the base station is not limited to a specific technical term. It should be noted that the base station in the NR system is taken only as an example in the embodiments of this application, but a specific type of the base station is not limited.

The following describes in detail a resource transmission method, a resource transmission apparatus, and a communications device provided in the embodiments of this application by using specific embodiments and application scenarios thereof with reference to the accompanying drawings.

Refer to FIG. 2. FIG. 2 is a flowchart of a resource transmission method according to an embodiment of this application. The resource transmission method is applied to a network-side device. As shown in FIG. 2, the resource transmission method includes the following steps.

Step 201. Send downlink control information DCI, the DCI being used to indicate that a terminal is to perform transmission of at least one shared channel; where in a case that the shared channels are at least two in quantity, each of the at least two shared channels is repeatedly transmitted N times, N being an integer greater than 1.

It can be understood that in data transmission between the network-side device and the terminal, the network-side device can deliver downlink control information (DCI) to the terminal, the DCI may include uplink and downlink resource configuration information, hybrid automatic repeat request (HARQ) information, power control information, and the like, and the terminal decodes data transmitted by the network side device based on the received DCI.

In this embodiment of this application, the DCI is used to indicate that the terminal is to perform transmission of at least one shared channel and in a case that the shared channels are at least two in quantity, repeatedly transmit each of the at least two shared channels N times, that is, at least twice. In this way, the network-side device can send the DCI once to schedule at least two shared channels for the terminal for repeated transmission in different slots or one slot, without a need for the network-side device to send multiple pieces of DCI for separate indication, which improves transmission efficiency between the network-side device and the terminal.

The shared channel is a physical uplink shared channel (PUSCH) or a physical downlink shared channel (PDSCH). That is, the DCI may be used to indicate that the terminal is to perform transmission of at least one PUSCH, or the DCI is used to indicate that the terminal is to perform transmission of at least one PDSCH.

In a communications system, uplink transmission mode is divided into dynamic grant (DG) based uplink transmission and configured grant (CG) based uplink transmission. In an implementation of this embodiment of this application, the shared channel is a dynamic grant based shared channel. In the following implementation, the shared channel being a DG-PUSCH is used as an example for detailed description.

Optionally, in this implementation, in a case that configuration information of the DCI indicates a first resource index table, the DCI is used to indicate that the terminal is to perform transmission of one shared channel and repeatedly transmit the shared channel N times; where the first resource index table includes no resource row index 2, the resource row index 2 being used to indicate that the terminal is to transmit at least two shared channels.

It should be noted that a time domain resource used by the terminal for transmission is determined according to a resource index table. The resource index table is configured by the network layer and indicated by a time domain resource assignment field in the DCI. The resource index table may include at least one row index. For example, the shared channel is a PUSCH, and as shown in FIG. 2*a*, the row index may be used to determine a PUSCH slot offset $K_2$ (that is, from which slot the PUSCH starts transmission after the DCI is received), a start symbol S for PUSCH transmission, and a PUSCH allocation length L, and may further include a PUSCH mapping type or the like. Then, based on the resource index table indicated in the configuration information of the DCI, the terminal can determine a length of PUSCH transmission, a start symbol for PUSCH transmission, a slot in which the PUSCH is transmitted, and other parameter information.

In this implementation, the terminal performs repeated transmission of one shared channel according to the DCI provided that the first resource index table indicated in the configuration information of the DCI includes no resource row index 2. For example, the first resource index table including no resource row index 2 may mean that the first resource index table includes only a resource row index 1, where if the resource row index 1 is used to indicate that the terminal is to transmit only one shared channel, the DCI is used to indicate transmission of one shared channel for the terminal and N repeated transmissions of the shared channel, N being an integer greater than 1.

Alternatively, in a case that configuration information of the DCI indicates a second resource index table, the DCI is used to indicate that the terminal is to perform transmission of at least one shared channel and transmit the at least one shared channel once; where the second resource index table includes at least one resource row index 2, the resource row index 2 being used to indicate that the terminal is to transmit at least two shared channels.

That is, if at least one resource row index in the second resource index table is used to indicate scheduling at least two shared channels for the terminal for transmission, in a case that the configuration information of the DCI transmitted by the network-side device indicates the second resource index table, the DCI is used to indicate that the terminal is to perform transmission of at least one shared channel and transmit each of the at least one shared channel once.

In this way, in a case that the configuration information of the DCI does not include a repetition count, the network-side device can indicate, by using the resource index table and the resource row index included in the configuration information of the DCI, that the terminal is to perform repeated transmission of one shared channel or one transmission of each of multiple shared channels.

In this implementation, the network-side device may alternatively configure the repetition count in the configuration information of the DCI. Optionally, in a case that configuration information of the DCI indicates a resource row index 2 and that the configuration information includes a repetition count, the DCI is used to indicate that the terminal is to perform transmission of at least one shared channel and transmit the at least one shared channel once; where the resource row index 2 is used to indicate that the terminal is to transmit at least two shared channels.

It should be noted that the configuration information of the DCI may include a resource index table including a resource row index 2. The resource index table may include only the resource row index 2, or may include the resource row index 1 and the resource row index 2. In this application, the configuration information of the DCI indicates a resource row index 2, and the repetition count is configured in the configuration information of the DCI. Based on the resource row index 2 and the repetition count, the terminal can perform at least one transmission of each of the at least one shared channel.

For example, in an optional implementation, in a case that the configuration information of the DCI indicates one shared channel, the DCI is used to indicate that the terminal is to perform transmission of the one shared channel and repeatedly transmit the one shared channel K times, K being the repetition count. That is, if the time domain resource assignment field in the DCI indicates scheduling one shared channel, and the repetition count K is configured in the configuration information of the DCI, the network-side device schedules the terminal to repeatedly transmit one shared channel K times.

Alternatively, in another optional implementation, in a case that the configuration information of the DCI indicates at least two shared channels, the DCI is used to indicate that the terminal is to perform transmission of the at least two shared channels and transmit each of the at least two shared channels once. In this implementation, even if the repetition count is configured in the configuration information of the DCI, the terminal may ignore the repetition count in the configuration information of the DCI, and transmits all scheduled shared channels only once.

For another example, in an optional implementation, in a case that the DCI indicates that time domain resources for shared channels are transmitted in one slot, the DCI is used to indicate that the terminal is to perform transmission of at least one shared channel and repeatedly transmit each of the at least one shared channel K times, K being the repetition count. In this implementation, the repetition count K is configured in the configuration information of the DCI, and the DCI indicates that the terminal is to perform transmission of at least one shared channel. If the DCI is also used to indicate that time domain resources for shared channels are transmitted in one slot, the terminal repeatedly transmits each of the at least one shared channel K times according to the DCI.

Refer to FIG. 2*a* and FIG. 2*b*. The configuration information of the DCI includes indicating a resource row index 2 in the resource index table. It can be seen from FIG. 2*a* that the resource row index 2 indicates transmission of three shared channels, and in this implementation, the terminal transmits the three shared channels indicated by the DCI in one slot and transmits each shared channel twice.

Alternatively, in another optional implementation, in a case that the DCI indicates that time domain resources for shared channels are transmitted in different slots, the DCI is used to indicate that the terminal is to perform transmission of at least one shared channel and transmit each of the at least one shared channel once. In this implementation, even though the repetition count is configured in the configuration information of the DCI, but the DCI indicates that time resources for the at least one shared channel of the terminal are to be transmitted in different slots, so that according to the DCI, the terminal performs transmission of the at least one shared channel in different slots and transmits each of the shared channels once.

Refer to FIG. 2*c*. The configuration information of the DCI includes indicating a resource row index 3 in the resource index table. It can be seen from FIG. 2*a* that the resource row index 3 indicates transmission of four shared channels, and in this implementation, the terminal performs transmission of the four shared channels indicated by the DCI and transmits each shared channel only once.

Alternatively, in another optional implementation, the DCI is used to indicate that the terminal is to perform transmission of at least one shared channel in a preset slot and repeatedly transmit each of the at least one shared channel K times, without transmitting any shared channel in a slot other than the preset slot, where K is the repetition count. In this implementation, the repetition count K is configured in the configuration information of the DCI, the DCI indicates that time resources for the at least one shared channel of the terminal are all to be transmitted in the preset slot, so that according to the DCI, the terminal performs repeated transmission of all shared channels in the preset slot K times and ignores shared channels in slots other than the preset slot, that is, skipping transmission of the shared channels in other slots.

It should be noted that the preset slot may be specified by the network-side device, for example, the first slot; or, that the preset slot is obtained by the terminal based on a slot in which an uplink grant is located plus a preset slot offset. For example, if the terminal receives the uplink grant in slot n and the slot offset is $K_2$, the preset slot is $n+K_2$.

Figure 2D:
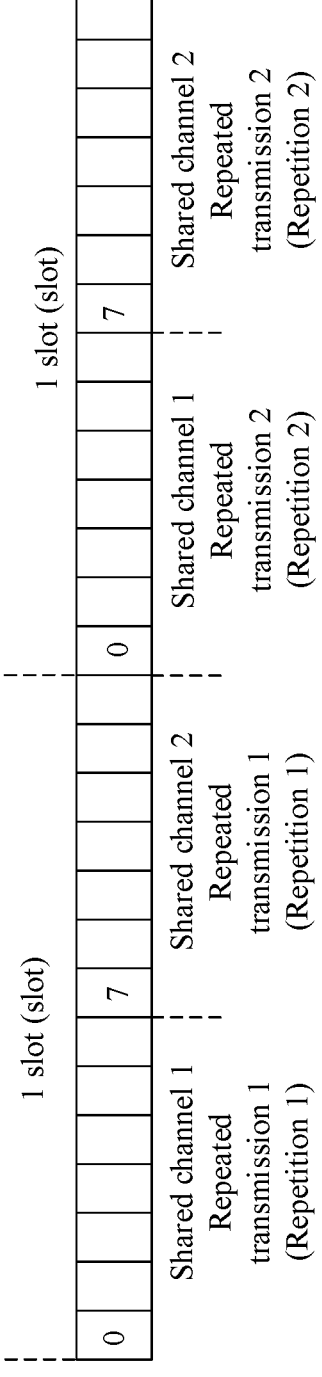
FIG. 2d is a schematic diagram of resource transmission in another resource transmission method according to an embodiment of this application.

Refer to FIG. 2*d*. The configuration information of the DCI includes indicating a resource row index 3 in the resource index table. It can be seen from FIG. 2*a* that the resource row index 3 indicates transmission of four shared channels, and in this implementation, the terminal transmits, in one slot, a shared channel 1 and a shared channel 2 of the four shared channels indicated by the DCI and transmits the two shared channels once in another slot, without transmitting the other two shared channels.

Optionally, in another optional implementation, even though the repetition count K is configured in the configuration information of the DCI, the terminal always ignores the repetition count, that is, the terminal performs transmission of the at least one shared channel indicated by the DCI and transmits each of the shared channels only once.

In another implementation of this application, in a case that the shared channel is PUSCH, the PUSCH is a configured grant (CG) based PUSCH; and in a case that the shared channel is PDSCH, the PDSCH is a semi-persistent scheduling SPS PDSCH. In the following, the shared channel being a configured grant based PUSCH is used as an example for detailed description.

Optionally, in an implementation, in a case that the configuration information includes the repetition count, the DCI is used to indicate a resource row index 1, where the resource row index 1 is used to indicate that the terminal is to transmit one shared channel. For example, even though the configuration information of the DCI includes the repetition count, the terminal does not expect the DCI to indicate sending of multiple shared channels. The configuration information of the DCI indicates a resource row index 1 in a resource index table (Time Domain Allocation List). The resource row index 1 is used to indicate scheduling one shared channel for the terminal for transmission; and in this case, the terminal performs transmission of one shared channel according to the DCI.

Alternatively, in another optional implementation, in a case that configuration information of the DCI indicates a resource row index 2 and that the configuration information includes a repetition count, if the configuration information of the DCI indicates at least two shared channels, and the at least two shared channels have a same symbol length, the DCI is used to indicate that the terminal is to perform transmission of the at least two shared channels and transmit the at least two shared channels based on a preset rule; where the resource row index 2 is used to indicate that the terminal is to transmit at least two shared channels, and the preset rule is: performing K transmissions of a first shared channel in the at least two shared channels within a transmission resource period of a configured grant, and if there is a remaining transmission position in the transmission resource period, performing transmission of a shared channel in the at least two shared channels other than the first shared channel in the remaining transmission position.

In this implementation, the configuration information of the DCI includes the repetition count K, and the time domain allocation list in the configuration information of the DCI includes a row (a resource row index 2) for indicating resource allocation for M (M>1) shared channels. If the M shared channels indicated in the configuration information of the DCI have a same symbol length, according to the DCI, the terminal performs transmission of the M shared channels and transmits the M shared channels based on the following rule: performing K transmissions of the first shared channel, and when there is a remaining transmission position in one period of the CG, performing transmission of a shared channel other than the first shared channel in the remaining transmission position. For example, if the remaining position is P (P<K), a second shared channel is repeatedly transmitted P times; if the remaining position is equal to K, the second shared channel is repeatedly transmitted K times; and if the remaining transmission position is greater than K, the second shared channel is repeatedly transmitted K times, and if there are other shared channels, the remaining shared channels are transmitted in the remaining transmission positions based on the foregoing rule after the transmission of the first shared channel and the second shared channel.

Figure 2F:
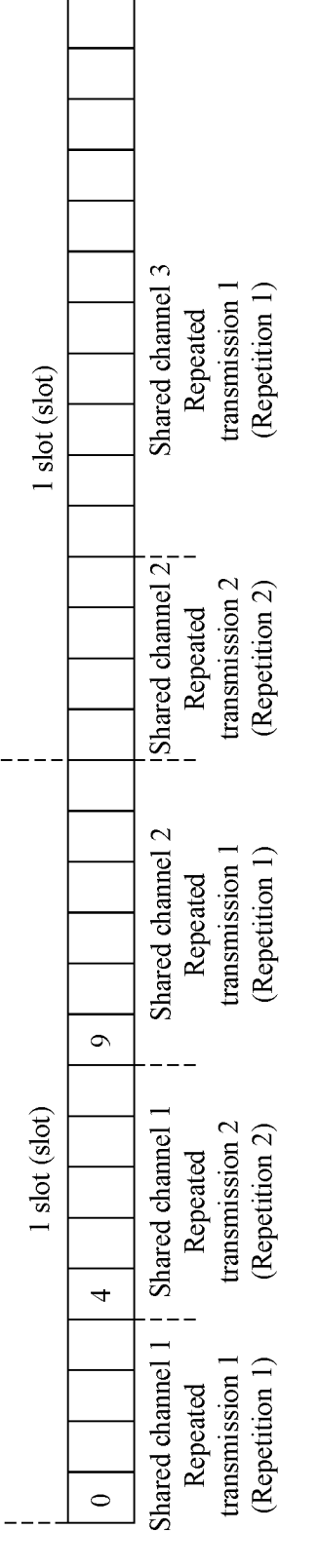
FIG. 2f is a schematic diagram of resource transmission in another resource transmission method according to an embodiment of this application.

Refer to FIG. 2e and FIG. 2f. The configuration information of the DCI includes indicating a resource row index 2 in the resource index table shown in FIG. 2e. It can be seen from FIG. 2e that the resource row index 2 indicates transmission of three shared channels, and in this implementation, the terminal first performs two transmissions of a shared channel 1 in the three shared channels indicated by the DCI, and then based on remaining transmission positions, performs two transmissions of a shared channel 2 and one transmission of a shared channel 3.

Alternatively, in a further optional implementation, in a case that configuration information of the DCI indicates a resource row index 2 and that the configuration information includes a repetition count, if the configuration information of the DCI indicates at least two shared channels, the DCI is used to indicate that the terminal is to perform K transmissions of a first shared channel in the at least two shared channels, without transmitting any shared channel in the at least two shared channels other than the first shared channel; where the resource row index 2 is used to indicate that the terminal is to transmit at least two shared channels, and K is the repetition count.

Figure 2G:
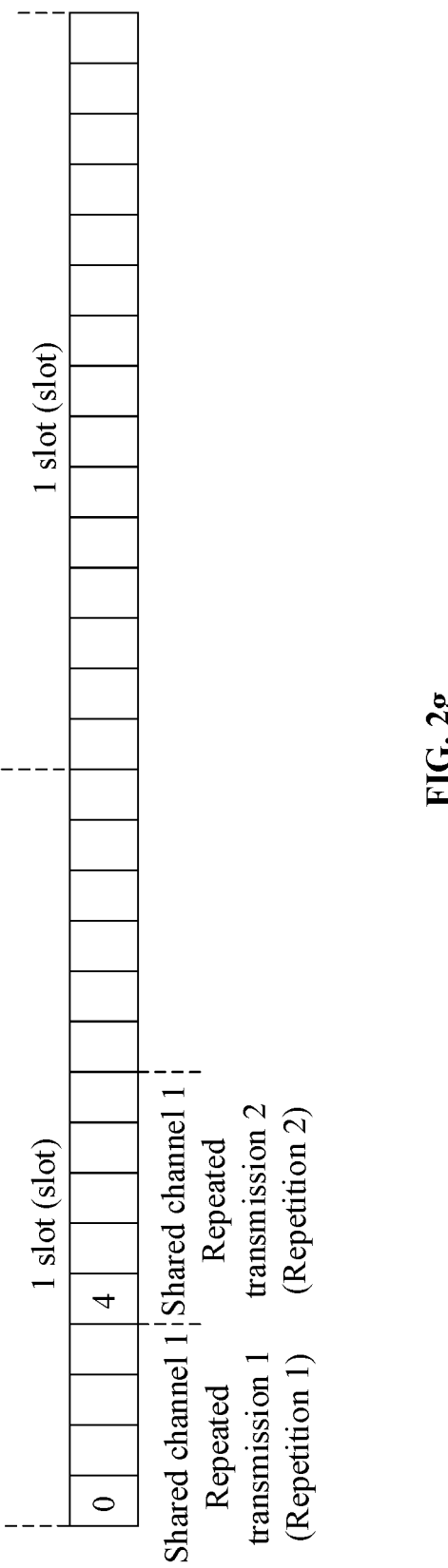
FIG. 2g is a schematic diagram of resource transmission in another resource transmission method according to an embodiment of this application.

Refer to FIG. 2e and FIG. 2g. The configuration information of the DCI includes indicating a resource row index 3 in the first resource index table. It can be seen from FIG. 2e that the resource row index 3 indicates transmission of four shared channels, and in this implementation, the terminal performs two transmissions of only shared channel 1 of the four shared channels indicated by the DCI, without transmitting remaining shared channels.

In this implementation, the configuration information of the DCI includes the repetition count K, and the time domain allocation list in the configuration information of the DCI indicates the resource row index 2. If the configuration information of the DCI indicates at least two shared channels, according to the DCI, the terminal performs K transmissions of the first shared channel in the at least two shared channels, without transmitting any shared channel other than the first shared channel.

In the resource transmission method provided in this application, the network-side device can send the DCI once to schedule at least two shared channels for the terminal for repeated transmission in different slots or one slot, and then without increasing DCI overheads, can enable the terminal to perform transmission of multiple different shared channels and repeated transmission of each shared channel to enhance coverage and reliability, reducing transmission load between the network-side device and the terminal and improving transmission efficiency between the network-side device and the terminal.

Figure 3:
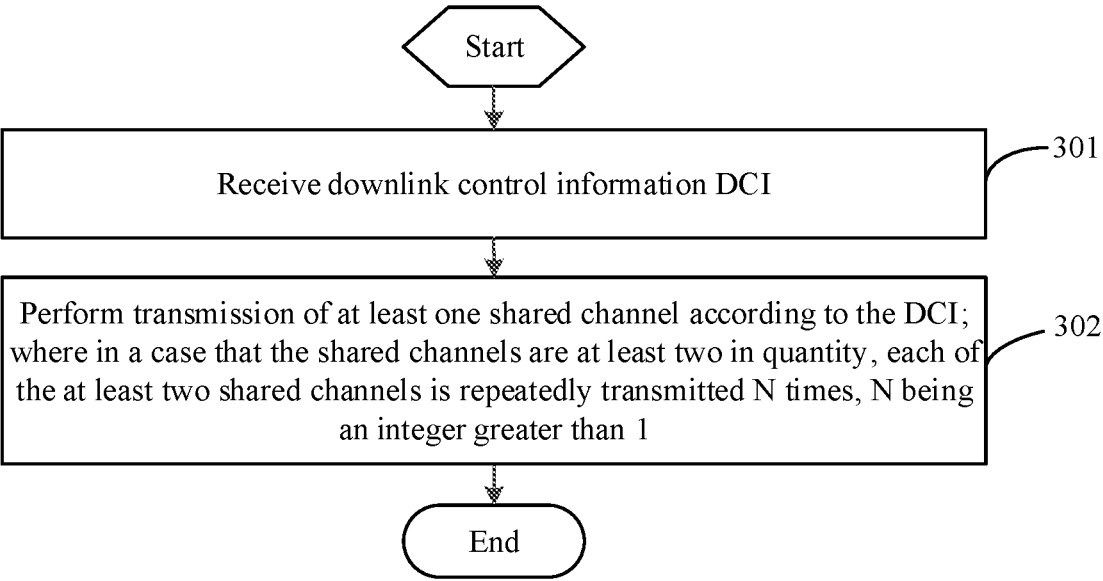
FIG. 3 is a flowchart of another resource transmission method according to an embodiment of this application.

Refer to FIG. 3. FIG. 3 is a flowchart of another resource transmission method according to an embodiment of this application. The resource transmission method is applied to a terminal. As shown in FIG. 3, the resource transmission method includes the following steps:

Step 301. Receive downlink control information DCI.

Step 302. Perform transmission of at least one shared channel according to the DCI; where in a case that the shared channels are at least two in quantity, each of the at least two shared channels is repeatedly transmitted N times, N being an integer greater than 1.

In this embodiment of this application, the terminal receives the downlink control information (DCI) delivered by a network-side device. The DCI is used to indicate that the terminal is to perform transmission of at least one shared channel, and based on the received DCI, the terminal performs transmission of the at least one shared channel and in a case that the shared channels are at least two in quantity, repeatedly transmits each of the at least two shared channels N times, that is, at least twice. In this way, without increasing DCI overheads, the terminal can perform transmission of multiple different shared channels and repeated transmission of each shared channel to enhance coverage and reliability, reducing transmission load between the network-side device and the terminal and improving transmission efficiency between the network-side device and the terminal.

The shared channel is a physical uplink shared channel (PUSCH) or a physical downlink shared channel (PDSCH). That is, the terminal may perform transmission of at least one PUSCH, or the terminal is to perform transmission of at least one PDSCH.

In a communications system, uplink transmission mode is divided into dynamic grant (DG) based uplink transmission and configured grant (CG) based uplink transmission. In an implementation of this embodiment of this application, the shared channel is a dynamic grant based shared channel. In the following implementation, a DG-PUSCH is used as an example of the PUSCH for detailed description.

Optionally, in a case that configuration information of the DCI indicates a first resource index table, step 302 may include:

according to the DCI, performing transmission of one shared channel and repeatedly transmitting the shared channel N times; where the first resource index table includes no resource row index 2, the resource row index 2 being used to indicate that the terminal is to transmit at least two shared channels.

It should be noted that a time domain resource used by the terminal for transmission is determined according to a resource index table. The resource index table is configured by the network layer and indicated by a time domain resource assignment field in the DCI. The resource index table may include at least one row index. For example, the shared channel is a PUSCH, and the row index may be used to determine a PUSCH slot offset $K_2$ (that is, from which slot the PUSCH starts transmission after the DCI is received), a start symbol S for PUSCH transmission, a PUSCH allocation length L, and a PUSCH mapping type. Then, based on the resource index table indicated in the configuration information of the DCI, the terminal can determine a length of PUSCH transmission, a start symbol for PUSCH transmission, a slot in which the PUSCH is transmitted, and other parameter information.

Optionally, the terminal performs repeated transmission of one shared channel according to the DCI provided that the first resource index table indicated in the configuration information of the DCI includes no resource row index 2. For example, the first resource index table including no resource row index 2 may mean that the first resource index table includes only the resource row index 1, where if the resource row index 1 is used to indicate that the terminal is to transmit only one shared channel, the terminal performs, according to the DCI, transmission of one shared channel and repeatedly transmits the shared channel N times, N being an integer greater than 1.

Optionally, in a case that configuration information of the DCI indicates a second resource index table, step 302 may include:

according to the DCI, performing transmission of at least one shared channel and transmitting the at least one shared channel once; where the second resource index table includes a resource row index 2, the resource row index 2 being used to indicate that the terminal is to transmit at least two shared channels.

In the foregoing two implementations, in a case that the configuration information of the DCI does not include a repetition count, the terminal can perform, based on the resource index table and the resource row index included in the configuration information of the DCI, repeated transmission of one shared channel or one transmission of each of multiple shared channels.

Optionally, the repetition count may alternatively be configured in the configuration information of the DCI. For example, in a case that configuration information of the DCI indicates a resource row index 2 and that the configuration information includes a repetition count, step 302 may include:

according to the DCI, performing transmission of at least one shared channel and transmitting the at least one shared channel at least once; where the resource row index 2 is used to indicate that the terminal is to transmit at least two shared channels.

Optionally, in a case that configuration information of the DCI indicates one shared channel, step 302 may include:

according to the DCI, performing transmission of one shared channel and repeatedly transmitting the one shared channel K times, K being the repetition count.

Optionally, in a case that configuration information of the DCI indicates at least two shared channels, step 302 may include:

according to the DCI, performing transmission of the at least two shared channels and transmitting each of the at least two shared channels once.

Optionally, in a case that the configuration information of the DCI indicates that time domain resources for shared channels are transmitted in one slot, step 302 may include:

according to the DCI, performing transmission of the at least one shared channel in one slot and repeatedly transmitting each of the at least one shared channel K times, K being the repetition count.

Optionally, in a case that the configuration information of the DCI indicates that time domain resources for shared channels are transmitted in different slots, step 302 may include:

according to the DCI, performing transmission of the at least one shared channel in different slots and transmitting each of the at least one shared channel once.

Optionally, the configuration information of the DCI is used to indicates transmission of at least one shared channel for the terminal in a preset slot, and step 302 may include:

according to the DCI, performing transmission of the at least one shared channel in the preset slot and repeatedly transmitting each of the at least one shared channel K times, without transmitting any shared channel in a slot other than the preset slot, where K is the repetition count.

Optionally, the preset slot is obtained by the terminal based on a slot in which an uplink grant is located plus a preset slot offset.

For the foregoing optional implementations, reference may be made to the specific description in the embodiment of the resource transmission method shown in FIG. 2. Details are not repeated in this embodiment.

In this embodiment of this application, in a case that the shared channel is PUSCH, the PUSCH is a configured grant (CG) based PUSCH; and in a case that the shared channel is PDSCH, the PDSCH is a semi-persistent scheduling SPS PDSCH. In the following, a configured grant based PUSCH is used as an example of the shared channel for detailed description.

Optionally, in a case that the configuration information includes the repetition count, the DCI is used to indicate a resource row index 1, where the resource row index 1 is used to indicate that the terminal is to transmit one shared channel. For example, even though the configuration information of the DCI includes the repetition count, the terminal does not expect to transmit multiple shared channels. The configuration information of the DCI indicates a resource row index 1 in a resource index table (Time Domain Allocation List). The resource row index 1 is used to indicate that the terminal is to transmit one shared channel; and in this case, the terminal performs transmission of one shared channel according to the DCI.

Optionally, in a case that configuration information of the DCI indicates a resource row index 2 and that the configuration information includes a repetition count, if the configuration information of the DCI indicates at least two shared channels, and the at least two shared channels have a same symbol length, step 302 may include:

according to the DCI, performing transmission of the at least two shared channels and transmitting the at least two shared channels based on a preset rule; where the resource row index 2 is used to indicate that the terminal is to transmit at least two shared channels, and the preset rule is: performing K transmissions of a first shared channel in the at least two shared channels within a transmission resource period of a configured grant, and if there is a remaining transmission position in the transmission resource period, performing transmission of a shared channel in the at least two shared channels other than the first shared channel in the remaining transmission position.

In this implementation, the configuration information of the DCI includes the repetition count K, and the time domain allocation list in the configuration information of the DCI includes a row (a resource row index 2) for indicating resource allocation for M (M>1) shared channels. If the M shared channels indicated in the configuration information of the DCI have a same symbol length, according to the DCI, the terminal performs transmission of the M shared channels and transmits the M shared channels based on the following rule: performing K transmissions of a first shared channel, and when there is a remaining transmission position in one period of the CG, performing transmission of a shared channel other than the first shared channel in the remaining transmission position. For example, if the remaining position is P (P<K), a second shared channel is repeatedly transmitted P times; if the remaining position is equal to K, the second shared channel is repeatedly transmitted K times; and if the remaining transmission position is greater than K, the second shared channel is repeatedly transmitted K times, and if there are other shared channels, the remaining shared channels are transmitted in the remaining transmission positions based on the foregoing rule after the transmission of the first shared channel and the second shared channel.

Optionally, in a case that configuration information of the DCI indicates a resource row index 2 and that the configuration information includes a repetition count, if the configuration information of the DCI indicates at least two shared channels, step 302 may include:

performing K transmissions of a first shared channel in the at least two shared channels according to the DCI, without transmitting any shared channel in the at least two shared channels other than the first shared channel; where the resource row index 2 is used to indicate that the terminal is to transmit at least two shared channels, and K is the repetition count.

In this implementation, the configuration information of the DCI includes the repetition count K, and the time domain allocation list in the configuration information of the DCI indicates the resource row index 2. If the configuration information of the DCI indicates at least two shared channels, according to the DCI, the terminal performs K transmissions of the first shared channel in the at least two shared channels, without transmitting any shared channel other than the first shared channel.

In the method provided in this embodiment of this application, the terminal receives the DCI sent by the network-side device, and can perform repeated transmission of at least two shared channels in different slots or one slot, and then without increasing DCI overheads, the network-side device can enable the terminal to perform transmission of multiple different shared channels and repeated transmission of each shared channel to enhance coverage and reliability, reducing transmission load between the network-side device and the terminal and improving transmission efficiency between the network-side device and the terminal.

It should be noted that the resource transmission method provided in this embodiment of this application may be performed by a resource transmission apparatus, or by a control module for performing the resource transmission method in the resource transmission apparatus. In this embodiment of this application, the resource transmission apparatus provided in this embodiment of this application is described by using an example in which the resource transmission apparatus performs the resource transmission method.

Figure 4:
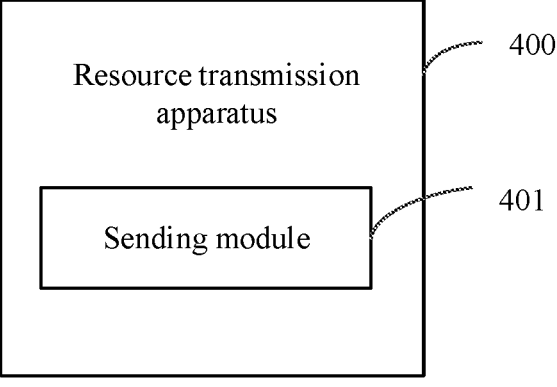
FIG. 4 is a structural diagram of a resource transmission apparatus according to an embodiment of this application.

Refer to FIG. 4. FIG. 4 is a structural diagram of a resource transmission apparatus according to an embodiment of this application. The resource transmission apparatus is applied to a network-side device. Optionally, the resource transmission apparatus further includes a processor. As shown in FIG. 4, the resource transmission apparatus 400 may include:

a sending module 401, configured to send downlink control information DCI, the DCI being used to indicate that a terminal is to perform transmission of at least one shared channel; where in a case that the shared channels are at least two in quantity, each of the at least two shared channels is repeatedly transmitted N times, N being an integer greater than 1.

Optionally, the shared channel is a physical uplink shared channel PUSCH or a physical downlink shared channel PDSCH.

Optionally, the shared channel is a dynamic grant based shared channel.

Optionally, in a case that configuration information of the DCI indicates a first resource index table, the DCI is used to indicate that the terminal is to perform transmission of one shared channel and repeatedly transmit the shared channel N times; where the first resource index table includes no resource row index 2, the resource row index 2 being used to indicate that the terminal is to transmit at least two shared channels.

Optionally, in a case that configuration information of the DCI indicates a second resource index table, the DCI is used to indicate that the terminal is to perform transmission of at least one shared channel and transmit the at least one shared channel once; where the second resource index table includes at least one resource row index 2, the resource row index 2 being used to indicate that the terminal is to transmit at least two shared channels.

Optionally, in a case that configuration information of the DCI indicates a resource row index 2 and that the configuration information includes a repetition count, the DCI is used to indicate that the terminal is to perform transmission of at least one shared channel and transmit the shared channel at least once; where the resource row index 2 is used to indicate that the terminal is to transmit at least two shared channels.

Optionally, in a case that the configuration information of the DCI indicates one shared channel, the DCI is used to indicate that the terminal is to perform transmission of the one shared channel and repeatedly transmit the one shared channel K times, K being the repetition count.

Optionally, in a case that the configuration information of the DCI indicates at least two shared channels, the DCI is used to indicate that the terminal is to perform transmission of the at least two shared channels and transmit each of the at least two shared channels once.

Optionally, in a case that the DCI indicates that time domain resources for shared channels are transmitted in one slot, the DCI is used to indicate that the terminal is to perform transmission of at least one shared channel and repeatedly transmit each of the at least one shared channel K times, K being the repetition count.

Optionally, in a case that the DCI indicates that time domain resources for shared channels are transmitted in different slots, the DCI is used to indicate that the terminal is to perform transmission of at least one shared channel and transmit each of the at least one shared channel once.

Optionally, the DCI is used to indicate that the terminal is to perform transmission of at least one shared channel in a preset slot and repeatedly transmit each of the at least one shared channel K times, without transmitting any shared channel in a slot other than the preset slot, where K is the repetition count.

Optionally, the preset slot is obtained by the terminal based on a slot in which an uplink grant is located plus a preset slot offset.

Optionally, in a case that the shared channel is PUSCH, the PUSCH is a configured grant based PUSCH; and in a case that the shared channel is PDSCH, the PDSCH is a semi-persistent scheduling SPS PDSCH.

Optionally, in a case that configuration information includes a repetition count, the DCI is used to indicate a resource row index 1; where the resource row index 1 is used to indicate that the terminal is to transmit one shared channel.

Optionally, in a case that configuration information of the DCI indicates a resource row index 2 and that the configuration information includes a repetition count, if the configuration information of the DCI indicates at least two shared channels, and the at least two shared channels have a same symbol length, the DCI is used to indicate that the terminal is to perform transmission of the at least two shared channels and transmit the at least two shared channels based on a preset rule; where the resource row index 2 is used to indicate that the terminal is to transmit at least two shared channels, and the preset rule is: performing K transmissions of a first shared channel in the at least two shared channels within a transmission resource period of a configured grant, and if there is a remaining transmission position in the transmission resource period, performing transmission of a shared channel in the at least two shared channels other than the first shared channel in the remaining transmission position.

Optionally, in a case that configuration information of the DCI indicates a resource row index 2 and that the configuration information includes a repetition count, if the configuration information of the DCI indicates at least two shared channels, the DCI is used to indicate that the terminal is to perform K transmissions of a first shared channel in the at least two shared channels, without transmitting any shared channel in the at least two shared channels other than the first shared channel; where the resource row index 2 is used to indicate that the terminal is to transmit at least two shared channels, and K is the repetition count.

In this embodiment of this application, the DCI sent by the resource transmission apparatus is used to indicate that the terminal is to perform transmission of at least one shared channel, and in a case that the shared channels are at least two in quantity, each of the at least two shared channels can be repeatedly transmitted at least twice. In this way, without increasing DCI overheads by the network-side device, the terminal can perform transmission of multiple different shared channels and repeated transmission of each shared channel to enhance coverage and reliability, reducing transmission load between the network-side device and the terminal and improving transmission efficiency between the network-side device and the terminal.

The resource transmission apparatus in this embodiment of this application may be an apparatus, or may be a component, an integrated circuit, or a chip in a terminal. The apparatus may be a mobile terminal or a non-mobile terminal. For example, the mobile terminal may include but is not limited to the foregoing illustrated types of terminals 11. The non-mobile terminal may be a server, a network attached storage (NAS), a personal computer (PC), a television (TV), a teller machine, a self-service machine, or the like. This is not specifically limited in the embodiments of this application.

The resource transmission apparatus provided in this embodiment of this application can implement the processes implemented in the method embodiment in FIG. 2, with the same technical effects achieved. To avoid repetition, details are not described herein again.

Figure 5:
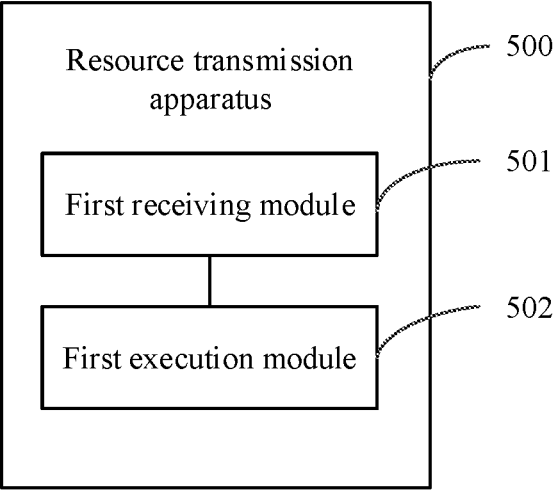
FIG. 5 is a structural diagram of another resource transmission apparatus according to an embodiment of this application.

Refer to FIG. 5. FIG. 5 is a structural diagram of another resource transmission apparatus according to an embodiment of this application. The resource transmission apparatus is applied to a terminal. Optionally, the resource transmission apparatus further includes a processor. As shown in FIG. 5, the resource transmission apparatus 500 may include:

a first receiving module 501, configured to receive downlink control information DCI; and a first execution module 502, configured to perform transmission of at least one shared channel according to the DCI; where in a case that the shared channels are at least two in quantity, each of the at least two shared channels is repeatedly transmitted N times, N being an integer greater than 1.

Optionally, the shared channel is a physical uplink shared channel PUSCH or a physical downlink shared channel PDSCH.

Optionally, the shared channel is a dynamic grant based shared channel.

Optionally, in a case that configuration information of the DCI indicates a first resource index table, the first execution module 502 is further configured to:

according to the DCI, perform transmission of one shared channel and repeatedly transmit the shared channel N times; where the first resource index table includes no resource row index 2, the resource row index 2 being used to indicate that the terminal is to transmit at least two shared channels.

Optionally, in a case that configuration information of the DCI indicates a second resource index table, the first execution module 502 is further configured to:

according to the DCI, perform transmission of at least one shared channel and transmit the at least one shared channel once; where the second resource index table includes at least one resource row index 2, the resource row index 2 being used to indicate that the terminal is to transmit at least two shared channels.

Optionally, in a case that configuration information of the DCI indicates a resource row index 2 and that the configuration information includes a repetition count, the first execution module 502 is further configured to:

according to the DCI, perform transmission of at least one shared channel and transmit the at least one shared channel at least once; where the resource row index 2 is used to indicate that the terminal is to transmit at least two shared channels.

Optionally, in a case that configuration information of the DCI indicates one shared channel, the first execution module 502 is further configured to:

according to the DCI, perform transmission of one shared channel and repeatedly transmit the one shared channel K times, K being the repetition count.

Optionally, in a case that configuration information of the DCI indicates at least two shared channels, the first execution module 502 is further configured to:

according to the DCI, perform transmission of the at least two shared channels and transmit each of the at least two shared channels once.

Optionally, in a case that the configuration information of the DCI indicates that time domain resources for shared channels are transmitted in one slot, the first execution module 502 is further configured to:

according to the DCI, perform transmission of the at least one shared channel in one slot and repeatedly transmit each of the at least one shared channel K times, K being the repetition count.

Optionally, in a case that the configuration information of the DCI indicates that time domain resources for shared channels are transmitted in different slots, the first execution module 502 is further configured to:

according to the DCI, perform transmission of the at least one shared channel in different slots and transmit each of the at least one shared channel once.

Optionally, the configuration information of the DCI is used to indicates transmission of at least one shared channel for the terminal in a preset slot, and the first execution module 502 is further configured to:

according to the DCI, perform transmission of the at least one shared channel in the preset slot and repeatedly transmit each of the at least one shared channel K times, without transmitting any shared channel in a slot other than the preset slot, where K is the repetition count.

Optionally, the preset slot is obtained by the terminal based on a slot in which an uplink grant is located plus a preset slot offset.

Optionally, in a case that the shared channel is PUSCH, the PUSCH is a configured grant based PUSCH; and in a case that the shared channel is PDSCH, the PDSCH is a semi-persistent scheduling SPS PDSCH.

Optionally, in a case that configuration information includes a repetition count, the DCI is used to indicate a resource row index 1; where the resource row index 1 is used to indicate that the terminal is to transmit one shared channel.

Optionally, in a case that configuration information of the DCI indicates a resource row index 2 and that the configuration information includes a repetition count, if the configuration information of the DCI indicates at least two shared channels, and the at least two shared channels have a same symbol length, the first execution module 502 is further configured to:

according to the DCI, perform transmission of the at least two shared channels and transmit the at least two shared channels based on a preset rule; where the resource row index 2 is used to indicate that the terminal is to transmit at least two shared channels, and the preset rule is: performing K transmissions of a first shared channel in the at least two shared channels within a transmission resource period of a configured grant, and if there is a remaining transmission position in the transmission resource period, performing transmission of a shared channel in the at least two shared channels other than the first shared channel in the remaining transmission position.

Optionally, in a case that configuration information of the DCI indicates a resource row index 2 and that the configuration information includes a repetition count, if the configuration information of the DCI indicates at least two shared channels, the first execution module 502 is further configured to:

perform K transmissions of a first shared channel in the at least two shared channels according to the DCI, without transmitting any shared channel in the at least two shared channels other than the first shared channel; where the resource row index 2 is used to indicate that the terminal is to transmit at least two shared channels, and K is the repetition count.

In this embodiment of this application, the first receiving module 501 receives the DCI sent by the network-side device, and the first execution module 502 can perform repeated transmission of at least two shared channels in different slots or one slot. Without increasing DCI overheads, the network-side device can enable the terminal to perform transmission of multiple different shared channels and repeated transmission of each shared channel to enhance coverage and reliability, reducing transmission load between the network-side device and the terminal and improving transmission efficiency between the network-side device and the terminal.

The resource transmission apparatus in this embodiment of this application may be an apparatus, or may be a component, an integrated circuit, or a chip in a terminal. The apparatus may be a mobile terminal or a non-mobile terminal. For example, the mobile terminal may include but is not limited to the foregoing illustrated types of terminals 11. The non-mobile terminal may be a server, a network attached storage (NAS), a personal computer (PC), a television (TV), a teller machine, a self-service machine, or the like. This is not specifically limited in the embodiments of this application.

The resource transmission apparatus in this embodiment of this application may be an apparatus with an operating system. The operating system may be an Android operating system, may be an iOS operating system, or may be another possible operating system. This is not specifically limited in this embodiment of this application.

The resource transmission apparatus provided in this embodiment of this application can implement the processes implemented in the method embodiment in FIG. 3, with the same technical effects achieved. To avoid repetition, details are not described herein again.

Figure 6:
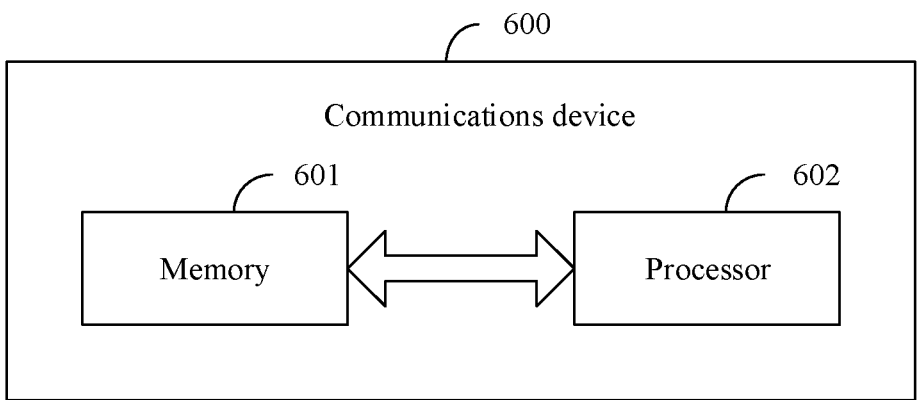
FIG. 6 is a structural diagram of a communications device according to an embodiment of this application.

Optionally, as shown in FIG. 6, an embodiment of this application further provides a communications device 600, including a processor 601, a memory 602, and a program or instructions stored in the memory 602 and capable of running on the processor 601. When the program or instructions are executed by the processor 601, the processes of the foregoing embodiments of the resource transmission method described in FIG. 2 are implemented, with the same technical effects achieved; or when the program or instructions are executed by the processor 601, the processes of the foregoing embodiments of the resource transmission method described in FIG. 3 are implemented, with the same technical effects achieved. To avoid repetition, details are not described herein again.

Figure 7:
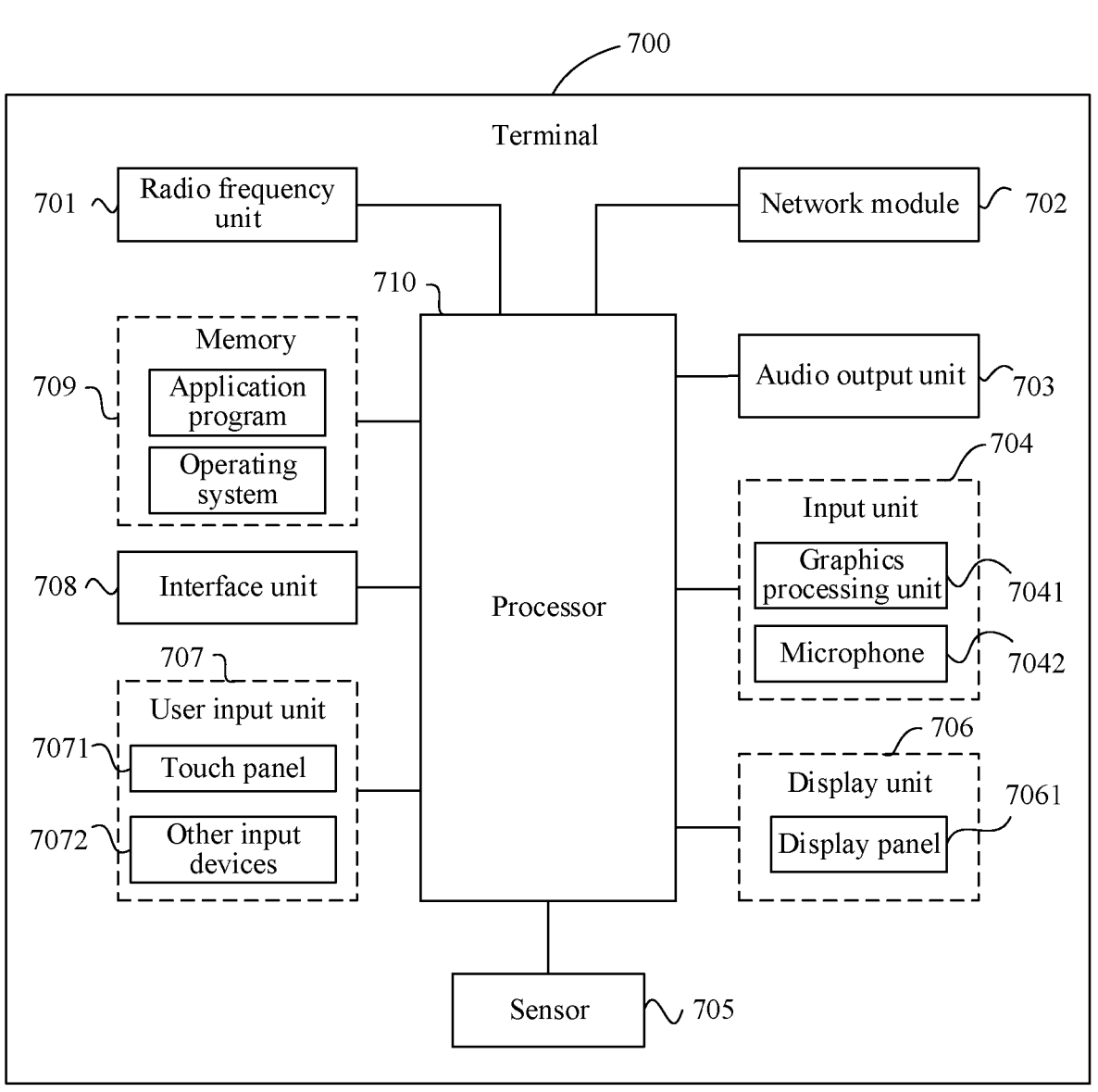
FIG. 7 is a structural diagram of a terminal according to an embodiment of this application.

An embodiment of this application further provides a terminal. Refer to FIG. 7. FIG. 7 is a schematic diagram of a hardware structure of a terminal for implementing the embodiments of this application.

The terminal 700 includes but is not limited to components such as a radio frequency unit 701, a network module 702, an audio output unit 703, an input unit 704, a sensor 705, a display unit 706, a user input unit 707, an interface unit 708, a memory 709, and a processor 710.

Those skilled in the art can understand that the terminal 700 may further include a power supply (for example, a battery) that supplies power to various components. The power supply may be logically connected to the processor 710 through a power supply management system, so that functions such as charge and discharge management and power consumption management are implemented by using the power management system. The terminal is not limited to the terminal structure shown in FIG. 7. The terminal may include more or fewer components than those shown in the figure, or combine some of the components, or arrange the components differently. Details are not described herein.

It should be understood that in this embodiment of this application, the input unit 704 may include a graphics processing unit (GPU) 7041 and a microphone 7042. The graphics processing unit 7041 processes image data of a static picture or a video that is obtained by an image capture apparatus (for example, a camera) in a video capture mode or an image capture mode. The display unit 706 may include the display panel 7061. The display panel 7061 may be configured in a form of a liquid crystal display, an organic light-emitting diode, or the like. The user input unit 707 includes a touch panel 7071 and other input devices 7072. The touch panel 7071 is also referred to as a touchscreen. The touch panel 7071 may include two parts: a touch detection apparatus and a touch controller. The other input devices 7072 may include but are not limited to a physical keyboard, a function button (for example, a volume control button or a power button), a trackball, a mouse, and a joystick. Details are not described herein.

In this embodiment of this application, the radio frequency unit 701 sends downlink information received from a network-side device to the processor 710 for processing, and in addition, sends uplink data to the network-side device. Generally, the radio frequency unit 701 includes but is not limited to an antenna, at least one amplifier, a transceiver, a coupler, a low noise amplifier, a duplexer, and the like.

The memory 709 may be configured to store software programs or instructions and various data. The memory 709 may mainly include a program or instructions storage area and a data storage area. The program or instructions storage area may store an operating system, an application program or instructions required by at least one function (for example, an audio play function or an image play function), and the like. In addition, the memory 709 may include a high-speed random access memory, and may further include a non-volatile memory, where the non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, For example, at least one disk storage device, a flash memory device, or other non-volatile solid-state storage devices.

The processor 710 may include one or more processing units. Optionally, the processor 710 may integrate an application processor and a modem processor. The application processor mainly processes an operating system, a user interface, an application program or instructions, and the like. The modem processor mainly processes wireless communication, and for example, may be a baseband processor.

It can be understood that the modem processor may alternatively not be integrated in the processor 710.

The radio frequency unit 701 is configured to receive downlink control information DCI.

The processor 710 is configured to perform transmission of at least one shared channel according to the DCI; where in a case that the shared channels are at least two in quantity, each of the at least two shared channels is repeatedly transmitted N times, N being an integer greater than 1.

Optionally, the shared channel is a physical uplink shared channel PUSCH or a physical downlink shared channel PDSCH.

Optionally, the shared channel is a dynamic grant based shared channel.

Optionally, in a case that configuration information of the DCI indicates a first resource index table, the processor 710 is further configured to:

according to the DCI, perform transmission of one shared channel and repeatedly transmit the shared channel N times; where the first resource index table includes no resource row index 2, the resource row index 2 being used to indicate that the terminal is to transmit at least two shared channels.

Optionally, in a case that configuration information of the DCI indicates a second resource index table, the processor 710 is further configured to:

according to the DCI, perform transmission of at least one shared channel and transmit the at least one shared channel once; where the second resource index table includes at least one resource row index 2, the resource row index 2 being used to indicate that the terminal is to transmit at least two shared channels.

Optionally, in a case that configuration information of the DCI indicates a resource row index 2 and that the configuration information includes a repetition count, the processor 710 is further configured to:

according to the DCI, perform transmission of at least one shared channel and transmit the at least one shared channel at least once; where the resource row index 2 is used to indicate that the terminal is to transmit at least two shared channels.

Optionally, in a case that configuration information of the DCI indicates one shared channel, the processor 710 is further configured to:

according to the DCI, perform transmission of one shared channel and repeatedly transmit the one shared channel K times, K being the repetition count.

Optionally, in a case that configuration information of the DCI indicates at least two shared channels, the processor 710 is further configured to:

according to the DCI, perform transmission of the at least two shared channels and transmit each of the at least two shared channels once.

Optionally, in a case that the configuration information of the DCI indicates that time domain resources for shared channels are transmitted in one slot, the processor 710 is further configured to:

according to the DCI, perform transmission of the at least one shared channel in one slot and repeatedly transmit each of the at least one shared channel K times, K being the repetition count.

Optionally, in a case that the configuration information of the DCI indicates that time domain resources for shared channels are transmitted in different slots, the processor 710 is further configured to:

according to the DCI, perform transmission of the at least one shared channel in different slots and transmit each of the at least one shared channel once.

Optionally, the configuration information of the DCI is used to indicates transmission of at least one shared channel for the terminal in a preset slot, and the processor 710 is further configured to:

according to the DCI, perform transmission of the at least one shared channel in the preset slot and repeatedly transmit each of the at least one shared channel K times, without transmitting any shared channel in a slot other than the preset slot, where K is the repetition count.

Optionally, the preset slot is obtained by the terminal based on a slot in which an uplink grant is located plus a preset slot offset.

Optionally, in a case that the shared channel is PUSCH, the PUSCH is a configured grant based PUSCH; and in a case that the shared channel is PDSCH, the PDSCH is a semi-persistent scheduling SPS PDSCH.

Optionally, in a case that configuration information includes a repetition count, the DCI is used to indicate a resource row index 1; where the resource row index 1 is used to indicate that the terminal is to transmit one shared channel.

Optionally, in a case that configuration information of the DCI indicates a resource row index 2 and that the configuration information includes a repetition count, if the configuration information of the DCI indicates at least two shared channels, and the at least two shared channels have a same symbol length, the processor 710 is further configured to:

according to the DCI, perform transmission of the at least two shared channels and transmit the at least two shared channels based on a preset rule; where the resource row index 2 is used to indicate that the terminal is to transmit at least two shared channels, and the preset rule is: performing K transmissions of a first shared channel in the at least two shared channels within a transmission resource period of a configured grant, and if there is a remaining transmission position in the transmission resource period, performing transmission of a shared channel in the at least two shared channels other than the first shared channel in the remaining transmission position.

Optionally, in a case that configuration information of the DCI indicates a resource row index 2 and that the configuration information includes a repetition count, if the configuration information of the DCI indicates at least two shared channels, the processor 710 is further configured to:

perform K transmissions of a first shared channel in the at least two shared channels according to the DCI, without transmitting any shared channel in the at least two shared channels other than the first shared channel; where the resource row index 2 is used to indicate that the terminal is to transmit at least two shared channels, and K is the repetition count.

In this embodiment of this application, the terminal receives the DCI sent by the network-side device, and can perform repeated transmission of at least two shared channels in different slots or one slot, and then without increasing DCI overheads, the network-side device can enable the terminal to perform transmission of multiple different shared channels and repeated transmission of each shared channel to enhance coverage and reliability, reducing transmission load between the network-side device and the terminal and improving transmission efficiency between the network-side device and the terminal.

Figure 8:
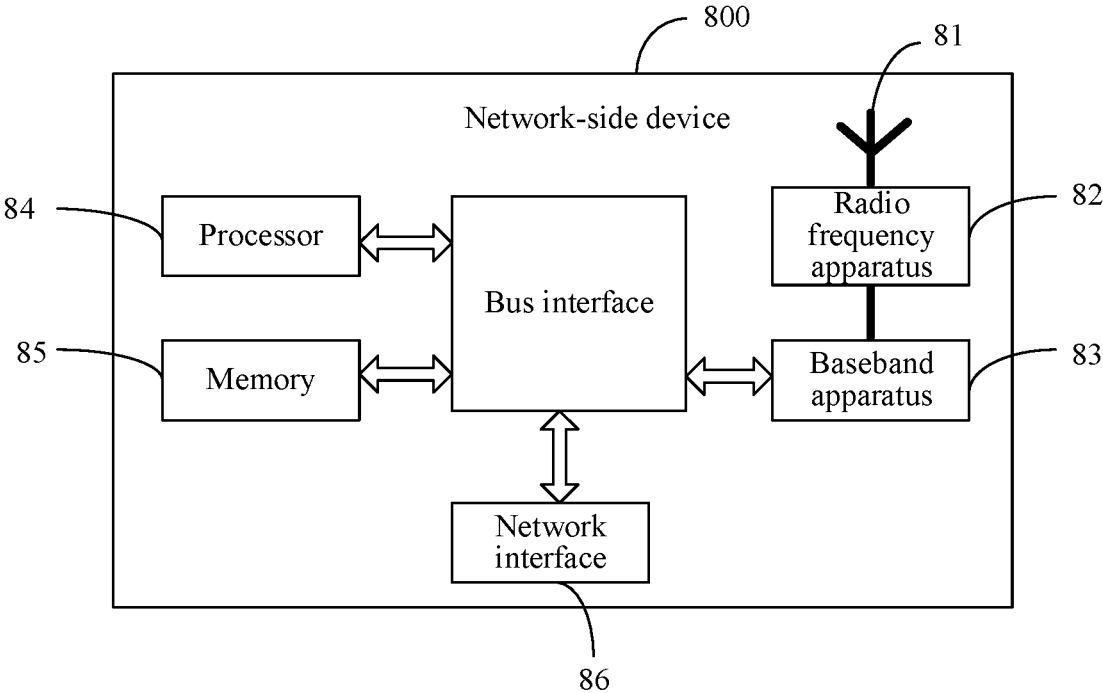
FIG. 8 is a structural diagram of a network-side device according to an embodiment of this application.

Specifically, an embodiment of this application further provides a network-side device. As shown in FIG. 8, the network-side device 800 includes an antenna 81, a radio frequency apparatus 82, and a baseband apparatus 83. The antenna 81 is connected to the radio frequency apparatus 82. In an uplink direction, the radio frequency apparatus 82 receives information by using the antenna 81, and transmits the received information to the baseband apparatus 83 for processing. In a downlink direction, the baseband apparatus 83 processes to-be-transmitted information, and transmits the information to the radio frequency apparatus 82; and the radio frequency apparatus 82 processes the received information and then transmits the information by using the antenna 81.

The frequency band processing apparatus may be located in the baseband apparatus 83. The method performed by the resource transmission apparatus in the foregoing embodiment of FIG. 4 may be implemented in the baseband apparatus 83, and the baseband apparatus 83 includes a processor 84 and a memory 85.

The baseband apparatus 83 may include, for example, at least one baseband processing unit, where a plurality of chips are disposed on the baseband processing unit. As shown in FIG. 8, one of the chips is, for example, the processor 84, and connected to the memory 85, to invoke the program in the memory 85 to perform the operations of the network device shown in the foregoing method embodiment.

The baseband apparatus 83 may further include a network interface 86, configured to exchange information with the radio frequency apparatus 82, where the interface is, for example, a common public radio interface (CPRI).

Specifically, the network-side device in this embodiment of this application further includes instructions or a program stored in the memory 85 and capable of running on the processor 84. The processor 84 invokes the instructions or program in the memory 85 to perform the method performed by the modules shown in FIG. 4, with the same technical effects achieved. To avoid repetition, details are not described herein again.

Figure 9:
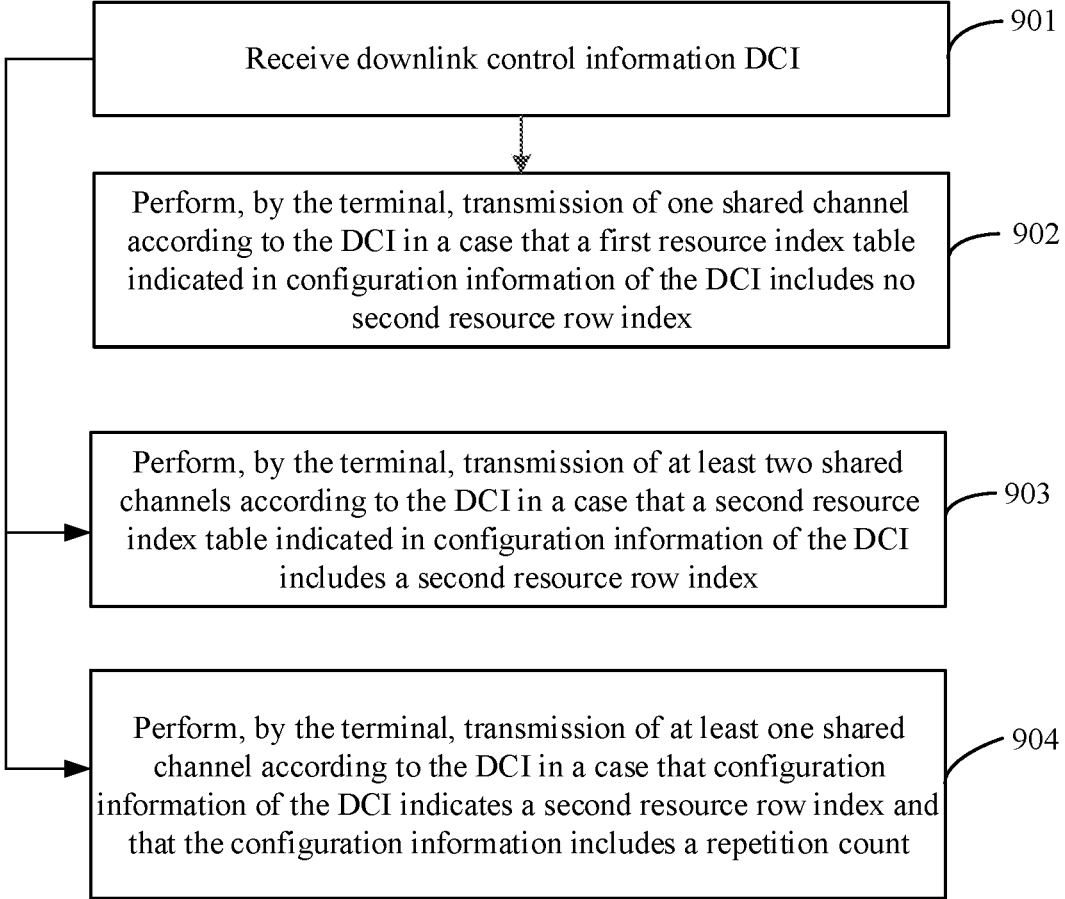
FIG. 9 is a flowchart of another resource transmission method according to an embodiment of this application.

Refer to FIG. 9. FIG. 9 is a flowchart of a resource transmission method according to an embodiment of this application. The resource transmission method is applied to a terminal. As shown in FIG. 9, the resource transmission method includes the following steps.

Step 901. The terminal receives downlink control information DCI.

Step 902. The terminal performs transmission of one shared channel according to the DCI in a case that a first resource index table indicated in configuration information of the DCI includes no resource row index 2;

or,

Step 903. The terminal performs transmission of at least two shared channels according to the DCI in a case that a second resource index table indicated in configuration information of the DCI includes a resource row index 2;

or,

Step 904. The terminal performs transmission of at least one shared channel according to the DCI in a case that configuration information of the DCI indicates a resource row index 2 and that the configuration information includes a repetition count; where the resource row index 2 is used to indicate that the terminal is to transmit at least two shared channels.

Optionally, the shared channel is a physical uplink shared channel PUSCH or a physical downlink shared channel PDSCH.

Optionally, the shared channel is a dynamic grant based shared channel.

Optionally, the performing transmission of one shared channel according to the DCI in a case that a first resource index table indicated in configuration information of the DCI includes no resource row index 2 includes:

according to the DCI, performing transmission of one shared channel and repeatedly transmitting the shared channel N times, N being an integer greater than 1.

Optionally, the performing transmission of at least two shared channels according to the DCI in a case that a second resource index table indicated in configuration information of the DCI includes a resource row index 2 includes:

according to the DCI, performing transmission of the at least two shared channels and transmitting the at least two shared channels once.

Optionally, in a case that the configuration information of the DCI includes the repetition count, the configuration information of the DCI includes no resource row index 2.

Figure 10:
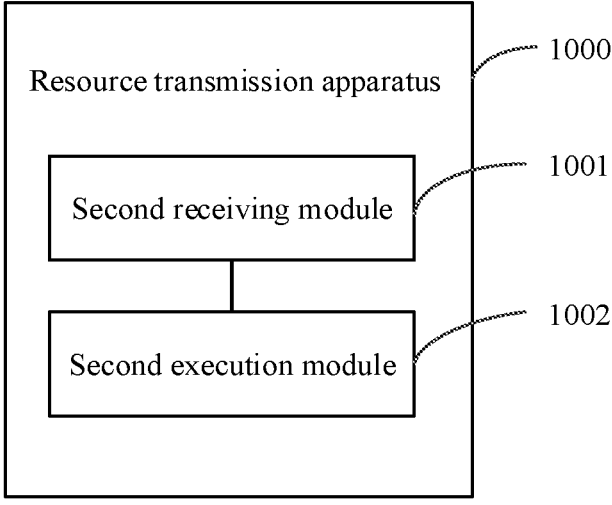
FIG. 10 is a structural diagram of another resource transmission apparatus according to an embodiment of this application.

Refer to FIG. 10. FIG. 10 is a structural diagram of another resource transmission apparatus according to an embodiment of this application. The resource transmission apparatus is applied to a terminal. As shown in FIG. 10, the resource transmission apparatus 1000 may include:

a second receiving module 1001, configured to receive downlink control information DCI; and a second execution module 1002, configured to perform transmission of one shared channel according to the DCI in a case that a first resource index table indicated in configuration information of the DCI includes no resource row index 2;

or, perform transmission of at least two shared channels according to the DCI in a case that a second resource index table indicated in configuration information of the DCI includes a resource row index 2;

or, perform transmission of at least one shared channel according to the DCI in a case that configuration information of the DCI indicates a resource row index 2 and that the configuration information includes a repetition count; where the resource row index 2 is used to indicate that the terminal is to transmit at least two shared channels.

Optionally, the shared channel is a physical uplink shared channel PUSCH or a physical downlink shared channel PDSCH.

Optionally, the shared channel is a dynamic grant based shared channel.

Optionally, the second execution module 1002 is specifically configured to: according to the DCI, perform transmission of one shared channel and repeatedly transmit the shared channel N times, N being an integer greater than 1.

Optionally, the second execution module 1002 is specifically configured to: according to the DCI, perform transmission of the at least two shared channels and transmit the at least two shared channels once.

Optionally, in a case that the configuration information of the DCI includes the repetition count, the configuration information of the DCI includes no resource row index 2.

Figure 11:
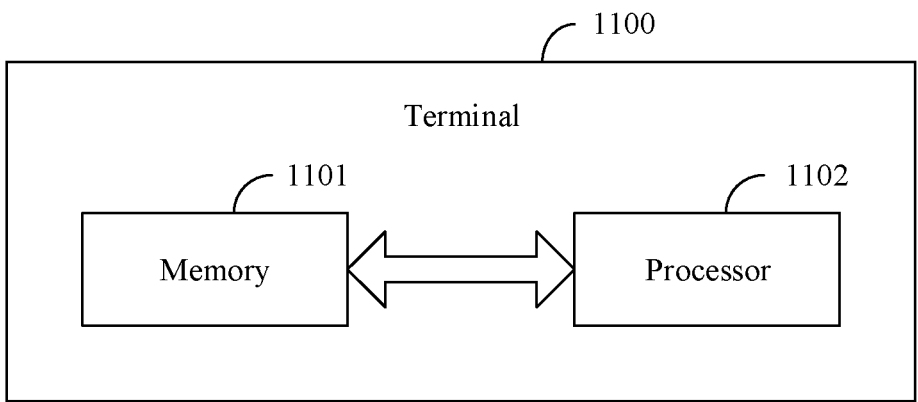
FIG. 11 is a structural diagram of another terminal according to an embodiment of this application.

Optionally, as shown in FIG. 11, an embodiment of this application further provides a terminal 1100, including a processor 1101, a memory 1102, and a program or instructions stored in the memory 1102 and capable of running on the processor 1101, where when the program or instructions are executed by the processor 1101, the steps of the foregoing resource transmission method shown in FIG. 9 are implemented.

An embodiment of this application further provides a readable storage medium, where the readable storage medium stores a program or instructions, and when the program or instructions are executed by a processor, the processes of the foregoing embodiments of the resource transmission method in FIG. 2 are implemented, or the processes of the foregoing embodiments of the resource transmission method in FIG. 3 are implemented, or the processes of the foregoing embodiments of the resource transmission method in FIG. 9 are implemented, with the same technical effects achieved. To avoid repetition, details are not described herein again.

The processor is the processor of the terminal in the foregoing embodiment. The readable storage medium includes a computer-readable storage medium such as a read-only memory (ROM), a random access memory (RAM), a magnetic disk, an optical disc, or the like.

An embodiment of this application further provides a chip, where the chip includes a processor and a communications interface, the communications interface is coupled to the processor, and the processor is configured to run a program or instructions to implement the processes of the foregoing embodiments of the resource transmission method in FIG. 2, or to implement the processes of the foregoing embodiments of the resource transmission method in FIG. 3, or to implement the processes of the foregoing embodiments of the resource transmission method in FIG. 9, with the same technical effects achieved. To avoid repetition, details are not described herein again.

It should be understood that the chip mentioned in this embodiment of this application may also be referred to as a system-on-chip, a system chip, a chip system, or the like.

It should be noted that the terms "comprise", "include", or any of their variants in this specification are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In the absence of more restrictions, an element defined by "including a . . . " does not exclude another same element in a process, method, article, or apparatus that includes the element. In addition, it should be noted that the scope of the methods and apparatuses in the embodiments of this application is not limited to performing functions in the order shown or discussed, but may further include performing functions at substantially the same time or in reverse order depending on the involved functions. For example, the described method may be performed in an order different from the described order, and steps may be added, omitted, or combined. In addition, features described with reference to some examples may be combined in other examples.

By means of the foregoing description of the implementations, persons skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of this application essentially or the part contributing to the prior art may be implemented in a form of a software product. The software product may be stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in each embodiment of this application.

It should be noted that, it should be understood that division of the modules is merely logical function division. Some or all of the modules may be integrated in a physical entity or may be separated physically in an actual implementation. In addition, the modules may be all implemented in a form of software invoked by a processing component, or may be all implemented in a form of hardware; or a part of modules may be implemented in a form of software invoked by a processing component, and another part of modules may be implemented in a form of hardware. For example, a determining module may be a processing component that is separately disposed, or may be integrated in a chip of the apparatus for implementation. In addition, the determining module may be stored in the memory of the apparatus in a form of program code, and is invoked by a processing component of the apparatus to perform a function of the determining module. Implementation of other modules is similar to this. In addition, all or some of the modules may be integrated, or may be implemented independently. Herein, the processing component may be an integrated circuit, and has a signal processing capability. In an implementation process, the steps in the foregoing method or the foregoing modules may be implemented by using an integrated logic circuit of hardware of the processor component or by using instructions in a form of software.

For example, the modules, units, subunits or submodules may be one or more integrated circuits configured to implement the foregoing method, for example, one or more application-specific integrated circuits (ASIC), or one or more microprocessors (digital signal processor, DSP), or one or more field programmable gate arrays (FPGA). For another example, when one of the foregoing modules is implemented in a form of program code invoked by a processing component, the processing component may be a general-purpose processor, for example, a central processing unit (CPU) or another processor that may invoke program code. For another example, the modules may be integrated in a form of a system-on-a-chip (SOC) for implementation.

The terms "first", "second", and the like in this specification and claims of this disclosure are used to distinguish between similar objects instead of describing a specific order or sequence. It should be understood that the data termed in such a manner are interchangeable in proper cases so that the embodiments of this disclosure can be implemented in other orders than the order illustrated or described in this application. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, product, or device. In addition, "and/or" used in this specification and claims indicates at least one of the connected objects. For example, "A and/or B and/or C" represents the following seven cases: only A; only B; only C; both A and B; both B and C; both A and C; and all A, B, and C. Similarly, in the specification and claims, the use of "at least one of A and B" should be interpreted as: "A alone, B alone, or both A and B".

The foregoing describes the embodiments of this application with reference to the accompanying drawings. However, this application is not limited to the foregoing specific embodiments. The foregoing specific embodiments are merely illustrative rather than restrictive. As instructed by this application, a person of ordinary skill in the art may develop many other manners without departing from principles of this application and the protection scope of the claims, and all such manners fall within the protection scope of this application.

What is claimed is:

1. A resource transmission method, performed by a network-side device and comprising:
   sending downlink control information (DCI),
   wherein in a case that configuration information of the DCI does not include a repetition count and a second resource index table indicated in the configuration information of the DCI includes the resource row index 2, the resource row index 2 is used to indicate that the terminal is to transmit at least two shared channels, and the DCI is used to indicate that the terminal is to perform transmission of at least two shared channels, and each one of the at least two shared channels is transmitted once.

2. The method according to claim 1, wherein the shared channel is a physical uplink shared channel (PUSCH) or a physical downlink shared channel (PDSCH).

3. The method according to claim 1, wherein the shared channel is a dynamic grant based shared channel.

4. The method according to claim 1, wherein in a case that the shared channel is PUSCH, the PUSCH is a configured grant based PUSCH; and in a case that the shared channel is PDSCH, the PDSCH is a semi-persistent scheduling (SPS) PDSCH.

5. A network-side device, comprising a processor, a memory, and a program or instructions stored in the memory and capable of running on the processor, wherein when the program or instructions are executed by the processor, the following steps are implemented:
   sending downlink control information (DCI),
   wherein in a case that configuration information of the DCI does not include a repetition count and a second resource index table indicated in the configuration information of the DCI includes the resource row index 2, the resource row index 2 is used to indicate that the terminal is to transmit at least two shared channels, and the DCI is used to indicate that the terminal is to perform transmission of at least two shared channels, and each one of the at least two shared channels is transmitted once.

6. The network-side device according to claim 5, wherein the shared channel is a physical uplink shared channel (PUSCH) or a physical downlink shared channel (PDSCH).

7. The network-side device according to claim 5, wherein the shared channel is a dynamic grant based shared channel.

8. A non-transitory readable storage medium, wherein the non-transitory readable storage medium stores a program or instructions, and when the program or instructions are executed by a processor of a network-side device, method according to claim 1 is implemented.

9. The network-side device according to claim 5, wherein in a case that the shared channel is PUSCH, the PUSCH is a configured grant based PUSCH; and in a case that the shared channel is PDSCH, the PDSCH is a semi-persistent scheduling (SPS) PDSCH.

10. A resource transmission method, performed by a terminal and comprising:

receiving downlink control information, DCI, wherein in a case that configuration information of the DCI does not include a repetition count and a second resource index table indicated in the configuration information of the DCI includes the resource row index 2, the resource row index 2 is used to indicate that the terminal is to transmit at least two shared channels, the method further comprises: performing, by the terminal, transmission of at least two shared channels according to the DCI, wherein each one of the at least two shared channels is transmitted once.

11. The method according to claim 10, wherein the shared channel is a physical uplink shared channel (PUSCH) or a physical downlink shared channel (PDSCH).

12. The method according to claim 10, wherein the shared channel is a dynamic grant based shared channel.

13. The method according to claim 10, wherein in a case that the shared channel is PUSCH, the PUSCH is a configured grant based PUSCH; and in a case that the shared channel is PDSCH, the PDSCH is a semi-persistent scheduling (SPS) PDSCH.

14. A non-transitory readable storage medium, wherein the non-transitory readable storage medium stores a program or instructions, and when the program or instructions are executed by a processor of a terminal, the method according to claim 10 is implemented.

\*   \*   \*   \*   \*